May 6, 1958     L. E. MATTHEWS ET AL     2,833,379
SHOCK AND VIBRATION ISOLATOR
Filed Dec. 10, 1954
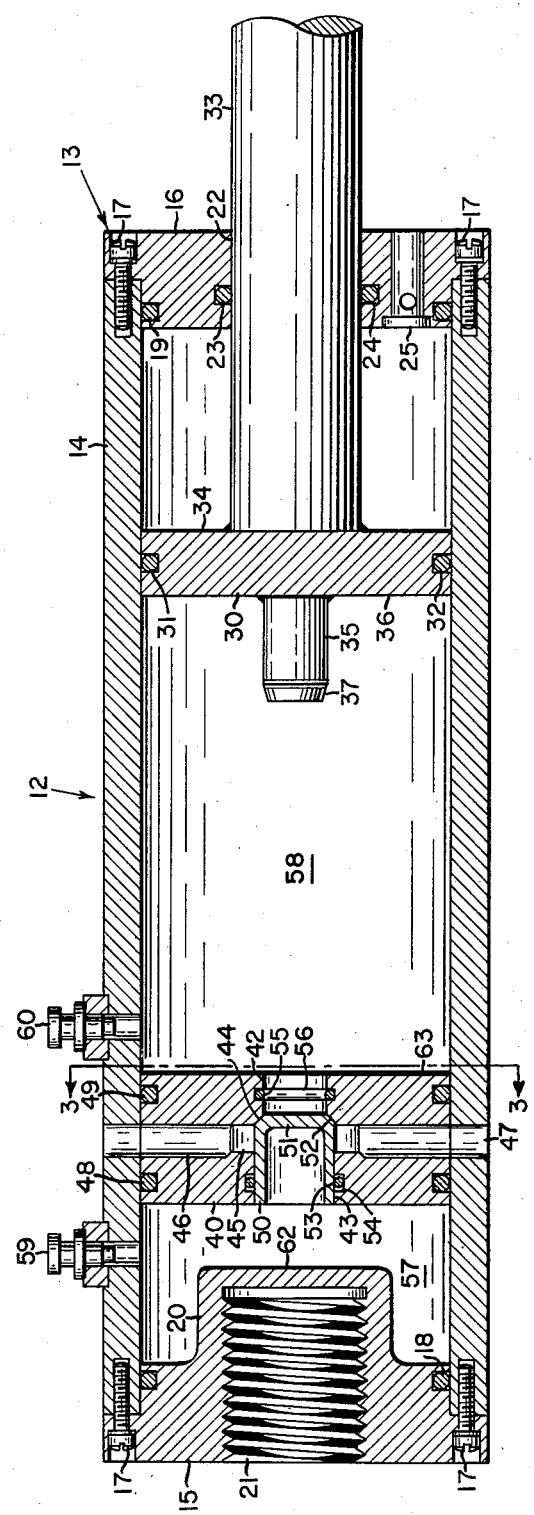
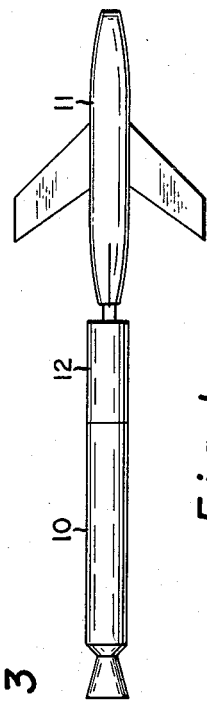
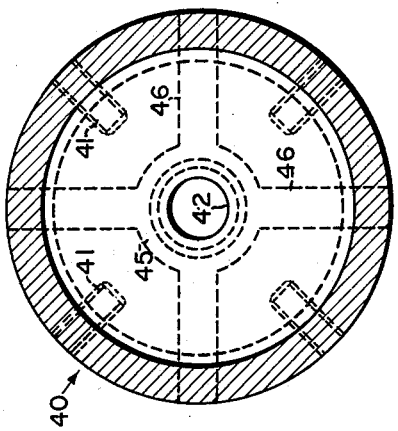
INVENTORS
LYLE E. MATTHEWS
E. QUIMBY SMITH JR.
BY
ATTORNEYS

United States Patent Office

2,833,379
Patented May 6, 1958

2,833,379
SHOCK AND VIBRATION ISOLATOR

Lyle E. Matthews, Santa Paula, and E. Quimby Smith, Jr., Oxnard, Calif., assignors to the United States of America as represented by the Secretary of the Navy Application December 10, 1954, Serial No. 474,632

7 Claims. (Cl. 188—94)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel shock and vibration isolator, and more particularly to a shock and vibration isolator wherein a compressible fluid is utilized as the energy absorbing medium and a valve means is provided whereby this fluid may be vented to atmosphere upon the application of a predetermined load to the device.

The invention device may be utilized in any application where it is desired to attenuate the vibrations and shocks transferred between two members which are connected to one another; however, the device is especially adapted for use with guided missiles wherein it may be connected between a missile and the propulsive motor therefor to prevent the transfer of excessive vibrations and shock loads to the missile. Since the electronic mechanism employed in such missiles is often fragile and is susceptible to damage, it is essential to prevent the transmission of large vibratory or shock loads to the missile since such forces may cause malfunctioning and eventual failure of the internal mechanism of the missile. Isolators have been designed for use with missiles, and many of these prior art devices have utilized a simple air spring-mass system which serves as a satisfactory vibration isolator for high frequency vibrations but which is unsatisfactory as a shock absorber because the compressible fluid buffer thereof acts as a hard spring whereby at low frequencies large shock loads, which occur especially at the time of launching, may be amplified many times. Furthermore, prior art devices are of such construction that they have fixed critical resonant frequencies whereby oscillations of the motor and shock loads applied at these frequencies are unduly amplified.

The present invention provides an arrangement wherein a valve means limits the pressure build-up of the fluid buffer of the device under a rapidly applied shock load and thereby prevents excessive shock loads from being transmitted to the missile, and at the same time, the device serves as an effective vibration isolator. In addition, as the device approaches a resonant condition, the valve means thereof is actuated and changes the resonant frequency of the spring-mass system of the device and accordingly prevents the device from oscillating with excessive amplitude of movement at any frequency.

An object of the present invention is the provision of a new and novel shock and vibration isolator which serves to effectively isolate the vibrations of one member from another member.

Another object is to provide a shock and vibration isolator which serves as a shock absorber and prevents excessive shock loads from being transmitted from a motor to a missile.

A further object of the invention is the provision of a shock and vibration isolator which has no fixed resonant frequency.

Still another object is to provide a shock and vibration isolator which is simple and inexpensive in construction, yet sturdy and reliable in operation.

Other objects and many of the attendant advantages of this invention will be readily appreciated as the same becomes better understood by reference to the following detailed description when considered in connection with the accompanying drawing wherein:

Fig. 1 shows the invention device mounted in position between a motor and a missile;

Fig. 2 is a longitudinal section of a preferred embodiment of the invention device, and Fig. 3 is a cross-sectional view of the device taken along the line 3—3 of Fig. 2 looking in the direction of the arrows.

Referring now to the drawing wherein like reference characters designate like or corresponding parts throughout the several views, there is shown in Fig. 1 a motor 10 which provides a propellant force to a missile 11. Interposed between and connected at opposite ends thereof to the motor and the missile is the improved shock and vibration isolator 12 of the present invention.

Referring now to Fig. 2 which illustrates the details of construction of the invention, the isolator comprises a body means indicated generally by reference numeral 13 and incudes a cylindrical member 14 having end members 15 and 16 secured thereto by suitable screws 17 thereby sealing the two open ends of member 14. O-ring seals 18 and 19 are provided in circumferential grooves formed in the outer periphery of members 15 and 16 respectively for sealing the end members with respect to cylinder 14.

End member 15 has an inwardly extending boss 20 and a hollow threaded portion 21 formed within the boss thereby providing a means for securing the motor to the device. End member 16 has a central opening 22 formed therethrough and an O-ring seal 23 is positioned within a circumferential groove 24 formed in end member 16 around opening 22. A piston member 30 has a slidable fit with the inner surface of cylinder 14 and an O-ring 31 is positioned within a circumferential groove 32 formed in the outer surface thereof for sealing the piston with respect to cylinder 14. A connecting rod 33 is suitably secured to face 34 of the piston and slidably fits within opening 22, being sealed with respect thereto by O-ring 23. The outer end of connecting rod 33 is provided with suitable means for connecting it to the missile. A short stud 35 is secured to face 36 of the piston, and is provided with a chamfered edge 37. Member 16 has a one-way valve 25 mounted therein which permits air to enter into the interior of cylinder 14 to the right of piston 30, but prevents escape of the air to atmosphere.

Referring now to Figs. 2 and 3, a dividing member 40 is provided with four equally circumferentially spaced threaded openings 41 and is secured to cylinder 14 by means of four screws (not shown), which are threaded through four equally circumferentially spaced openings (not shown) provided in cylinder 14 and into openings 41. A cylindrical opening is formed longitudinally through member 40 and includes a first portion 42 and an enlarged portion 43, these two portions being connected by a sloping portion 44 which provides a valve seat.

An annular recess 45 is provided about portion 43 and opens into the longitudinal opening through member 40. Four equally circumferentially spaced radial passages 46 are formed in member 40 and open into recess 45, passages 46 being positioned circumferentially midway between openings 41. Four corresponding openings 47 are formed through the outer wall of cylinder 14 in radial alignment with passages 46 whereby the passages are vented to atmosphere at all times. O-ring seals 48 and 49 are provided in suitable circumferential grooves formed in the outer surface of dividing member 40 for sealing member 40 with respect to cylinder member 14. It should be understood that other suitable means such as welding may be employed to secure dividing member 40 in place within cylinder member 14.

A valve member 50 has a cylindrical outer periphery and is slidably disposed within portion 43. One end portion 51 of member 50 is closed and has a sloping portion 52 formed on the outer surface thereof for engaging seat portion 44 thereby sealing the longitudinal opening through dividing member 40. The opposite end of valve member 50 is open and the interior portion of member 50 is hollowed out to reduce the weight thereof. An O-ring seal 53 is provided in a circumferential groove 54 formed in portion 43 for sealing valve member 50 with respect to portion 43. An O-ring 55 is provided in circumferential groove 56 formed in portion 42 for a purpose which will hereinafter be described.

It should be noted that dividing member 40 divides the interior of cylinder member 14 into two closed chambers 57 and 58 each of which is in communication with one of the opposite faces of valve member 50. A conventional tire-type filler valve 59 is mounted in the wall of cylinder 14 such that it is accessible from the exterior of the body means and communicates with chamber 57 whereby a fluid under pressure may be introduced into or vented from the chamber. A similar valve 60 is provided in another portion of the wall of cylinder 14 and communcates with chamber 58. If it is not feasible to provide valves in the outer surface of cylinder member 14, valves 59 and 60 may be provided in either of the end members 15 or 16 with the provision of suitable passages formed in the walls of cylinder member 14 for connecting the valves with chambers 57 and 58 respectively.

When the device is utilized in missile applications, the maximum amount of thrust which it is desired to transmit through the isolator to the missile is initially calculated. Valve member 50 is initially loaded by precharging chamber 57 such that it seals chamber 58 whereupon chamber 58 is precharged with a fluid, e. g. air or the like, under pressure with piston 30 abutting member 16, the pressure in chamber 58 being such that upon a predetermined desired movement of the piston, the force exerted against face 36 of the piston will be equal to the thrust applied by the motor. If the thrust of the motor exceeds this amount, the pressure in chamber 58 will increase and it is desirable to then permit valve member 50 to slide axially to the left and vent chamber 58 momentarily to atmosphere through the longitudinal opening in member 40, annular recess 45, passages 46 and the aligned openings in member 14.

Chamber 57 is accordingly initially precharged to a pressure which will permit movement of valve member 50 to the left upon the fluid in chamber 58 reaching the desired exhaust pressure. Due to the fact that the effective area of member 50 which is acted upon by the fluid in chamber 58 is slightly smaller than the effective area of member 50 acted upon by the fluid in chamber 57, and due to the friction between member 50 and member 40 and the inertia of member 50, the initial pressure in chamber 57 must be lower than the desired exhaust pressure in chamber 58. For example, if the desired exhaust pressure in chamber 58 is 560 p. s. i., the precharge pressure in chamber 58 when piston 30 abuts member 16 will be 285 p. s. i. and the precharge pressure in chamber 57 will be 500 p. s. i.

When the pressure in chamber 58 reaches the desired exhaust pressure, valve member 50 will be moved to the left and vent chamber 58 to atmosphere; but as the pressure starts to drop in chamber 58, the pressure in chamber 57 will again force member 50 to seat against portion 44 and seal chamber 58. It is apparent that as excessive shock loads are successively applied to the device, member 50 will continue to open and close thereby preventing excessive pressure build-up in chamber 58 and the transfer of excessive loads to the missile. Face 62 of boss 20 serves to limit the movement of member 50 to the left and prevents the outer surface thereof from becoming disengaged with portion 43.

As valve member 50 allows the fluid within chamber 58 to periodically escape therefrom, piston 30 will continue to be displaced to the left within cylinder 14. As face 36 of piston 30 approaches face 63 of member 40, stud 35 is forced into portion 42 and has a sliding fit therewith such that in cooperation with seal 55, stud 35 serves to seal chamber 58 whereby the fluid trapped between faces 36 and 63 cannot escape to atmosphere. This feature provides a safety means which prevents face 36 from striking face 63 and causes the device to act as a simple air spring after predetermined relative movement between the piston and the cylinder, thereby providing an effective vibration isolator at all times. It is anticipated that stud 35 will not enter into portion 42 under normal operating conditions, however, under abnormal conditions this action may occur. Since the most dangerous shock loads are produced by the motor at launching of the missile and during the initial flight thereof, the device will have served its purpose in preventing excessive shock loads by the time stud 35 enters into portion 42.

Since valve 50 opens at a predetermined pressure of the fluid within chamber 58, it is obvious that the maximum amount of thrust which may be transmitted through the device is effectively limited. Furthermore, this periodic opening of member 50 also prevents the development of a critical resonant condition in the device. As a resonant condition is approached, the amplitude of oscillation of piston 30 with respect to cylinder 14 will accordingly increase thereby increasing the pressure of the fluid in chamber 58. When the desired exhaust pressure is reached as the amplitude of oscillation increases, valve 50 will open thereby releasing the potential energy from the simple air spring-mass system, changing the equilibrium position of member 30 and the natural frequency of the device.

Fluid pressure is utilized as the valve loading means in chamber 57 of the present invention for two important reasons. Firstly, the air has low inertia and therefore will permit a better response of valve 50 to changes in pressure of the fluid in chamber 58. Secondly, the fluid which may be preferably air exhibits practically a constant force versus displacement characteristic for small motions of the valve member.

The utilization of the one-way valve 25 in end member 16 is considered preferable since air will be trapped between face 34 of piston 30 and end member 16 thereby providing a small air cushion to the right of the piston. However, through openings may be provided in member 16 in place of the one-way valve means without affecting the proper operation of the device.

It is apparent from the foregoing that there is provided a new and novel shock and vibration isolator which effectively isolates vibrations of a motor from the missile and prevents excessive shock loads from being transmitted from the motor to the missile. The invention device does not have a fixed resonant frequency and is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

We claim:

1. A device for minimizing the transmission of shocks and vibration from a first member to a second member, comprising an essentially cylindrical body means carried by said second member and having first and second closed chambers formed therein, a fluid disposed within each of said chambers, the fluid in said second chamber being initially under greater pressure than the fluid in said first chamber, piston means carried by said first member and positioned within said body means for slidable movement along the longitudinal axis thereof, said body means having passage means formed therethrough for venting said first chamber to atmosphere, valve means having opposed faces and being disposed within said body means for slidable movement coaxially with said piston means for normally sealing said passage means and preventing said first chamber from being in communication with atmosphere, means for applying the pressure of the fluid in said first chamber to one face of said valve means, and means for applying the pressure of the fluid in said second chamber to the opposite face of said valve means, the instantaneous position of said valve means on the longitudinal axis of said cylindrical body means being determined by the difference in pressure of the fluids in said two chambers.

2. A device for minimizing the transmission of shocks and vibration from a first member to a second member, comprising a cylindrical body means carried by one of said members and having first and second closed chambers formed therein, a compressible fluid under pressure disposed within each of said chambers, the fluid in said second chamber being initially under greater pressure than the fluid in said first chamber, piston means carried by the remaining one of said members and slidably positioned within said first chamber for movement along the longitudinal axis of said cylindrical body means, said body means having passage means formed therethrough for venting said first chamber to atmosphere, means for introducing and venting fluids into and from each of said chambers, valve means having opposed faces and being disposed within said body means for slidable movement coaxially with said piston means for normally sealing said passage means and preventing said first chamber from being in communication with atmosphere, means for applying the pressure of the fluid in said first chamber to one face of said valve means, and means for applying the pressure of the fluid in said second chamber to the opposite face of said valve means, the instantaneous position of said valve means on the longitudinal axis of said cylindrical body means being determined by the difference in pressure of the fluids in said two chambers.

3. A device as defined in claim 2 including means for limiting the movement of said valve means in opposite directions.

4. A device as defined in claim 2 including a stud projecting from said piston means for preventing communication of said first chamber with atmosphere upon predetermined movement of said piston means.

5. A shock and vibration isolator which comprises a hollow body means having opposite end portions and also having first and second closed chambers formed therein, a compressible fluid under presssure disposed within each of said chambers, piston means slidably positioned within said first chamber, said body means having passage means formed therethrough for venting said first chamber on one side of said piston means to atmosphere, one-way valve means in one of said end portions providing communication of atmosphere with said first chamber on the opposite side of said piston means, valve means for introducing and venting fluids into and from each of said chambers, control valve means having opposed faces and being slidably positioned within said body means for normally sealing said passage means and preventing said first chamber on said one side of said piston means from being in communication with atmosphere, one face of said control valve means being in contact with and acted upon by the fluid in said first chamber, and the opposite face of said control valve means being in contact with and acted upon by the fluid in said second chamber.

6. A device as defined in claim 5 wherein said one end portion of said body means has an opening formed therethrough, and said piston means having connecting means secured thereto, said connecting means slidably fitting within said last-mentioned opening.

7. A shock and vibration isolator which comprises hollow body means having opposite end portions and also having first and second closed chambers formed therein, one of said end portions being so constructed and arranged as to provide a limit stop means and also including means for securing another member thereto, the opposite end portion having one-way valve means passing therethrough and a central opening formed therethrough, a compressible fluid under pressure disposed within each of said chambers, piston means slidably positioned within said first chamber, said body means having passage means formed therethrough for venting said first chamber to atmosphere, valve seat means mounted in said body means, valve means for introducing and venting fluids into and from each of said chambers, control valve means having opposed faces and a sealing portion formed thereon and being slidably positioned within said body means, connecting means secured to one face of said piston means and slidably fitting within said central opening formed in said opposite end portion, means secured to the opposite face of said piston for preventing communication of said first chamber with atmosphere upon predetermined movement of said piston means, one face of said control valve means being in contact with and acted upon by the fluid in said first chamber, and the opposite face of said control valve means being in contact with and acted upon by the fluid in said second chamber, the fluid in said second chamber being under greater pressure than the fluid in said first chamber whereby the sealing portion of said valve means is normally urged into engagement with said valve seat means.

References Cited in the file of this patent

UNITED STATES PATENTS

| 1,530,043 | George | Mar. 17, 1925 |
| 1,794,981 | Phillpott et al. | Mar. 3, 1931 |
| 2,765,054 | Rossman | Oct. 2, 1956 |